(12) United States Patent
Ahola et al.

(10) Patent No.: US 11,307,588 B2
(45) Date of Patent: Apr. 19, 2022

(54) VEHICLE ACCESSORY ARRANGEMENT

(71) Applicant: Hiab AB, Kista (SE)

(72) Inventors: Erkki Ahola, Kangasala (FI); Hannu Hyttinen, Laitila (FI)

(73) Assignee: Hiab AB, Kista (SE)

( * ) Notice: Subject to any disclaimer, the term of this patent is extended or adjusted under 35 U.S.C. 154(b) by 236 days.

(21) Appl. No.: 16/809,967

(22) Filed: Mar. 5, 2020

(65) Prior Publication Data

US 2020/0285237 A1 Sep. 10, 2020

(30) Foreign Application Priority Data

Mar. 6, 2019 (EP) .................................... 19161092

(51) Int. Cl.
*G05D 1/00* (2006.01)
*B60R 16/023* (2006.01)
(Continued)

(52) U.S. Cl.
CPC ......... *G05D 1/0094* (2013.01); *B60R 16/023* (2013.01); *B66F 9/063* (2013.01);
(Continued)

(58) Field of Classification Search
CPC .. G05D 1/00; G05D 1/02; B60R 16/02; B66F 9/06
See application file for complete search history.

(56) References Cited

U.S. PATENT DOCUMENTS 6,167,337 A 12/2000 Haack et al.
2014/0188324 A1 7/2014 Waltz et al.
(Continued)

FOREIGN PATENT DOCUMENTS

WO 2013/180622 A1 12/2013

OTHER PUBLICATIONS

Extended European Search Report for corresponding European Patent Application No. 19161092.2 dated May 15, 2019.

*Primary Examiner* — Tan Q Nguyen
(74) *Attorney, Agent, or Firm* — Renner, Otto, Boisselle & Sklar, LLP

(57) ABSTRACT

A vehicle accessory arrangement (2) structured to be mounted on a vehicle (4), the accessory arrangement (2) comprises a working equipment (6), an accessory control unit (8) configured to determine accessory control signals (10) and to control said working equipment (6) by said signals, and an accessory communication bus (12) comprising a bus interface (14) configured to connect said accessory communication bus (12) to a vehicle communication bus (16) provided at said vehicle. The accessory arrangement (2) comprises a wireless signal receiver (18) configured to receive current position data, e.g. GPS data, and working assignment data including route data for a working assignment for said vehicle (4) provided with said working equipment (6).

The accessory control unit (8) is configured to receive a vehicle data set among a plurality of different vehicle data sets, each of said plurality of vehicle data sets comprises control characteristics of a vehicle on which the accessory arrangement may be mounted. The accessory control unit (8) is configured to determine, based upon said control characteristics, navigation and drive control commands adapted to control said vehicle (4) provided with said vehicle accessory arrangement (2) to work in an autonomous mode and to travel along a route of a working assignment, and working control commands adapted to control said vehicle (2) such that working procedures performed by said working equipment (6) are supported. And that the accessory control unit (8) is configured to control said vehicle (4) provided with said vehicle accessory arrangement (2), by said determined
(Continued)

navigation and drive commands and working control commands, to fulfil said working assignment.

15 Claims, 2 Drawing Sheets

(51) Int. Cl.
  *B66F 9/06* (2006.01)
  *G05D 1/02* (2020.01)
  *B60R 16/02* (2006.01)
(52) U.S. Cl.
  CPC ......... *G05D 1/0212* (2013.01); *G05D 1/0278* (2013.01); *G05D 2201/0216* (2013.01)

(56) References Cited

U.S. PATENT DOCUMENTS

| | | |
|---|---|---|
| 2017/0028994 A1 | 2/2017 | Addison et al. |
| 2017/0160745 A1 | 6/2017 | Lauffer et al. |
| 2017/0227969 A1 | 8/2017 | Murray et al. |
| 2019/0043351 A1* | 2/2019 | Yang .................. G06K 9/00369 |
| 2019/0045207 A1* | 2/2019 | Chen .................... G06K 9/6232 |

\* cited by examiner

VEHICLE ACCESSORY ARRANGEMENT

This application claims priority to European Patent Application No. 19161092.2 filed on Mar. 6, 2019, which is hereby incorporated herein by reference.

TECHNICAL FIELD

The present disclosure generally relates to an accessory arrangement comprising a working equipment configured to be mounted on a vehicle, and a method in relation thereto.

BACKGROUND

A vehicle may be provided with an accessory arrangement, e.g. a working equipment, mounted on the vehicle. The vehicle is exemplified e.g. by a load-carrying vehicle, such as a truck used for transporting cargo and goods. The cargo and goods may e.g. be placed on or packaged in portable compartments such as containers, flat racks or interchangeable pallets. The portable compartments are loaded onto the body of the vehicle by the working equipment for transport and unloaded from the hull to the ground. The position of the vehicle in relation to the cargo to be loaded, or in relation to the position where the cargo is to be unloaded, is important for the performance of the working equipment during the loading and unloading. Skilled drivers are needed to safely operate the vehicle and working equipment during the loading and unloading. Examples of such working equipment are hook-lifts, skip loaders, demountables and loader cranes. Hook-lifts are e.g. used to load flat racks or containers onto a truck by engaging a hook to a bar at the container or flat rack and then lifting and/or pulling the flat rack or container onto the truck.

It is well known that truck manufacturers develop and market mainly truck chassis with their actuators and their control systems. These chassis (trucks) are acquired by customers and used for different purposes. Depending on these purposes, additional working equipment designed to implement the purpose is attached to the chassis frame. These accessories are often developed and marketed by different companies than truck manufacturers. These companies are designing accessories to fit the different manufacturers' chassis, considering the different specifications, for example, dimensions and connections to the control system and power delivery systems of the chassis.

As mentioned above one widely used load-carrying accessory is a hook-lift device. The manufacturers of hook-lift devices must ensure that the produced devices are adapted to be mounted on chassis of vehicles from different vehicle manufacturers.

Load-carrying vehicles are not only used for transporting goods on public roads, they may further be used for dedicated purposes e.g. within the process industry, and in one typical example, a process control system sends an assignment to a driver of the truck to transport a filled hopper and to replace it with an empty bin.

One other specific implementation environment for vehicles provided with an accessory arrangement is a closed mining area where it is known to use autonomously moving vehicles, e.g. trucks, for moving rocks and operate according to the duties assigned by a mine control center. In a working assignment, information is sent wirelessly to the vehicle where the information for example include data about the route including directions for driving a route and instructions for e.g. loading a container at an endpoint of the route.

Generally, an autonomous vehicle is a vehicle that is capable of sensing its environment and moving with little or no human input. Autonomous vehicles combine a variety of sensors to perceive their surroundings, such as radar, computer vision, Lidar, sonar, GPS, odometers and inertial measurement units. Advanced control systems interpret sensory information to identify appropriate navigation paths, as well as obstacles and relevant signage. An autonomous vehicle provided with a variety of sensors and also set-up to fulfil all necessary safety standards, requires a complex and advanced, and then also expensive, control system.

Vehicles have since long been provided with a distributed control system based on a communication bus (e.g. a so-called. CAN bus) that allows connection of various devices, sharing of data and functions between different devices and independent control over a digital data network.

In the following some prior art documents disclosing various aspects of autonomous vehicles will be briefly discussed.

US-2014/0188324 relates to a system for providing a vehicular navigation control interface capable of implementing an automatic mode including an automatic control function of the vehicle.

US-2017/0028994 relates to a control module for controlling different vehicles.

US-2017/0160745 discloses an autonomous vehicle platform including various controllers for controlling different systems of the vehicle.

Truck manufacturers have built their chassis and their models technically distinct in many different ways. Particularly the differences in chassis control and actuators make it difficult to connect the same type of autonomous navigation or remote control to different chassis. Especially, this is a problem when someone other than the chassis manufacturer offers a variety of chassis to be equipped with the feature of autonomous navigation or remote control. For example, presently known systems or devices do not provide the accessory manufacturer with a convenient way of providing an autonomous and/or remote-controlled load handling and transport solution on a variety of truck chassis in conjunction with an accessory.

The aforementioned problems with the autonomous drive feature on different chassis are e.g. related to how to generate commands given to the actuators of the vehicle in order to follow the route from the navigation computer when e.g. the mechanical structure of the chassis (e.g. affecting the turning radius) and, the response time of the operating control received by the actuator turning the front wheel may vary with the type of chassis, chassis brand, chassis model, or even individual chassis unit. Among other things, these factors are model specific for the chassis and may be different for different manufacturers. In addition, engine, transmission, brakes have the same basics but a detailed implementation may differ according to the model and the manufacturer, so that disparities are to be taken into account when driving in an autonomous way when determining the route for acceleration, braking and gear shifting.

Thus, the chassis have been equipped with an infrastructure to enable different functions and uses, but different chassis solutions may be problematic to implement for autonomous use for the manufacturer of the accessory, for the above reasons.

Although many solutions have been presented and applied according to presently known technique there still remain challenges in the technical field.

The object of the present invention is to achieve an improved vehicle accessory arrangement configured to be mounted on an optional vehicle and provided with control capabilities adapted to the control of the vehicle and also operable when the vehicle is to be operated in an autonomous mode.

SUMMARY

The above-mentioned object is achieved, or at east mitigated, by the present invention according to the independent claims.

Preferred embodiments are set forth in the dependent claims.

The inventors of the present invention have realized that in some situations it is advantageous to move the intelligence from the vehicle to the accessory arrangement. By intelligence is herein specifically meant the complex control required to control the vehicle, provided with the accessory arrangement, to work in an autonomous mode. Thereby, the vehicle does not need to be provided with advanced, and thus expensive, control capabilities that are adapted to the application that the accessory arrangement is aimed for.

Thus, the present invention provides an accessory arrangement capable of adapting its control capabilities to the vehicle where the accessory arrangement is mounted, by applying a vehicle data set among a plurality vehicle data sets, wherein a specific vehicle data set comprises control characteristics of a specific vehicle. The vehicle accessory arrangement according to the present invention is advantageous in that a specific accessory arrangement easily may be adapted to the specific requirements of a specific vehicle, especially with regard to control the vehicle when the vehicle is to be operated in an autonomous mode of operation, by determining and applying the vehicle data set of the specific vehicle.

A further advantage with the invention is that the accessory arrangement in addition to controlling the vehicle is controlling a work equipment. The accessory arrangement may hence control the vehicle and working equipment concurrently to achieve a work assignment where e.g. movements of both the work equipment and vehicle needs to be synchronized and cooperative.

A further advantage with the invention is that the control capabilities of the accessory arrangement, for both the vehicle and the work equipment, may be adapted to perform the type of work assignments associated with the work equipment mounted on the accessory arrangement.

DETAILED DESCRIPTION

The vehicle accessory arrangement will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
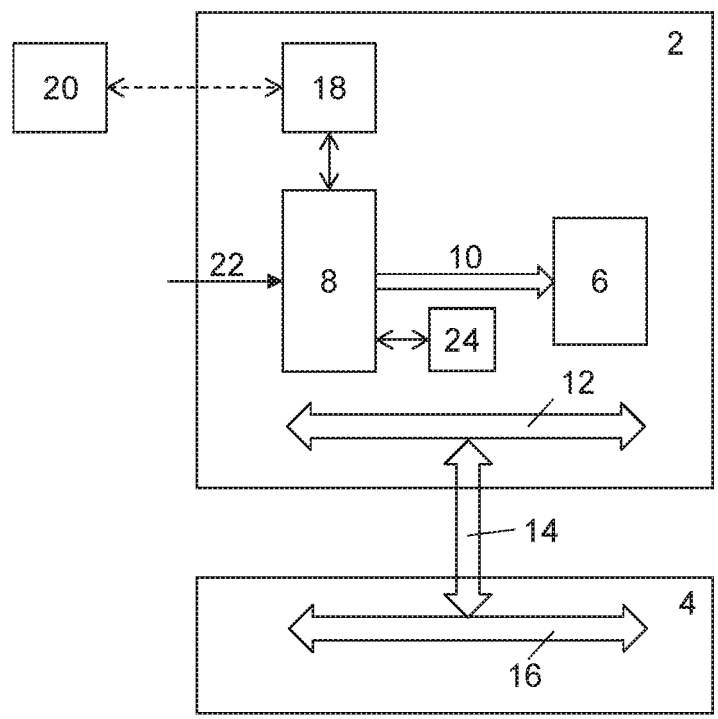
FIG. 1 is a block diagram schematically illustrating the accessory arrangement according to present invention.
Figure 2:
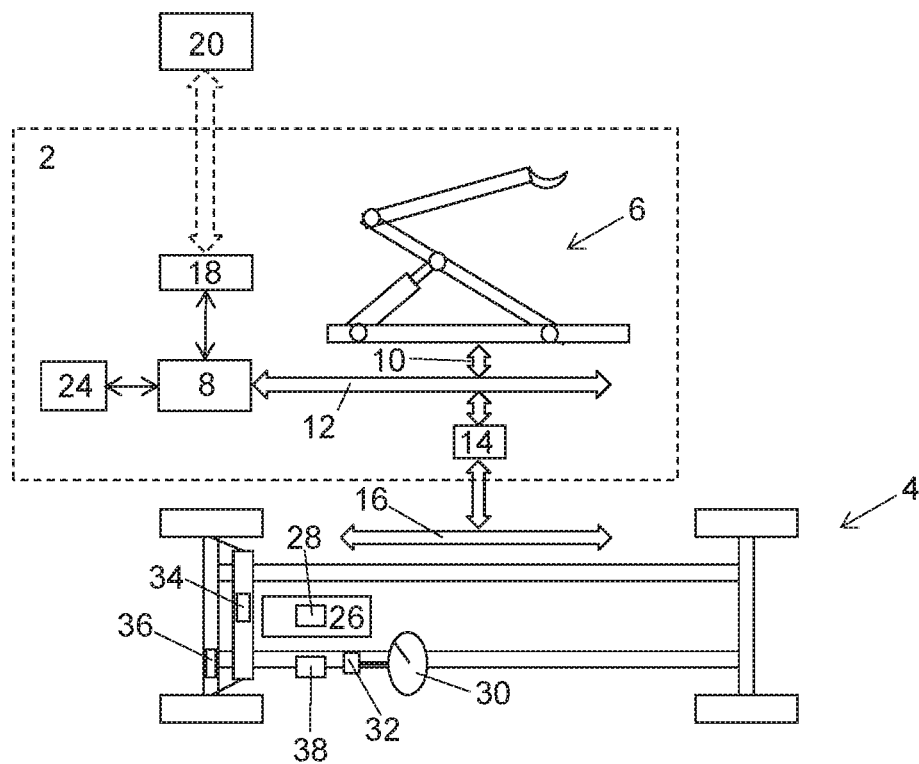
FIG. 2 is a block diagram schematically illustrating an embodiment of the accessory arrangement according to the present invention.

First with reference to the schematic illustrations in FIGS. 1 and 2 a vehicle accessory arrangement 2 is provided which is structured to be mounted on a vehicle 4. The vehicle is preferably a working vehicle, e.g. a cargo vehicle, a truck, or a forestry vehicle. The vehicle may be an autonomous vehicle, or a semi-autonomous vehicle. A semi-autonomous vehicle is a vehicle where an operator to a certain degree is involved in the operation of the vehicle, e.g. the operator receives operating instructions via an interface, e.g. a graphical user interface or via computer generated audial or tactile instructions.

The accessory arrangement 2 comprises a working equipment 6, an accessory control unit 8 configured to determine accessory control signals 10 and to control the working equipment 6 by said signals, and an accessory communication bus 12 comprising a bus interface 14 configured to connect the accessory communication bus 12 to a vehicle communication bus 16 provided at the vehicle.

Each communication bus is a common data bus, e.g. a CAN bus, which is configured to perform bidirectional communication, e.g. comprising sensor and control signals. Further protocols based on CAN may be applied, like application layer protocols such as SAE J1939 for in-vehicle networks for buses and trucks may further be used for the communication. As an alternative various protocols based on Ethernet and similar standards may be used such as Broad R Reach. Various communication protocols may be used in different parts of the system.

In FIG. 2 the working equipment 6 is exemplified by a hook-lift, but may also be e.g. a loading and unloading equipment, a forestry machine, a tail lift, a crane, a loader crane, or a mining equipment.

The vehicle is schematically illustrated as a chassis of a vehicle, which may be any type of vehicle capable of having an accessory arrangement mounted on the vehicle and provided with various control units controllable via signals from a vehicle communication bus. Both the accessory communication bus and the vehicle communication bus may be realized by virtual wireless communication buses.

In FIG. 2 vehicle 4 is shown as a truck chassis is schematically shown comprising an engine 26 with an engine injection pump valve 28, and manual driving control units including a steering wheel 30, a power steering unit 32, accelerator pedal, brake pedal, and a chassis control unit 38. The chassis control unit 38 converts the analogue movements of the manual driving control units to digital operation control commands that pass through the vehicle communication bus 16 to actuators such as a control cylinder valve 34, a brake valve 36 and the engine injection pump valve 28. The illustrated items of the vehicle 4 are only exemplary, and many more actuators, sensors, and control units are optionally provided in order to fully control and operate the vehicle. Note that FIG. 2 is a schematic illustration where, for clarity reasons, e.g. control lines from the communication buses to various units are not shown. Furthermore, the present invention is naturally also applicable in battery powered vehicles provided with one or many electrically driven engine.

The accessory arrangement 2 comprises a wireless signal receiver 18 configured to receive current position data, e.g. GPS data, and working assignment data including route data for a working assignment for the vehicle 4 provided with the working equipment 6, and to make the received position data and working assignment data available to the accessory control unit 8. The working assignment data may e.g. include specification of objects (e.g. cargo, goods, portable compartments) to be loaded or unloaded and the position and orientation of these objects.

The received position data may be GPS data or any equivalent positioning data. If the vehicle is intended for underground use, for example in a mine, the position data may be generated by positional antennas mounted at fixed positions along routes where the vehicle is moving. Positional antennas may also be applied in large storage facilities.

The accessory control unit S is configured to receive a vehicle data set among a plurality of different vehicle data sets. Each of the plurality of vehicle data sets comprises control characteristics of a vehicle on which the accessory arrangement may be mounted. Generally, a specific vehicle data set is a collection of data related to various control characteristics related for a specific vehicle and organised e.g. in a database, or in a table. The various control characteristics may be dynamically updated.

The accessory control unit 8 is configured to determine:
Navigation and drive control commands adapted to control the vehicle 4 provided with the vehicle accessory arrangement 2 to work in an autonomous mode and to travel along a route of a working assignment.
Working control commands adapted to control the vehicle 4 such that working procedures performed by the working equipment 6 are supported.

As an example working control commands may be generated to adjust the position and orientation of the vehicle in relation to a portable compartment to be loaded onto the vehicle. Another example of working control commands may be commands that move the vehicle while the work equipment is interacting with a portable compartment in order to facilitate the loading or unloading procedure that the work equipment is performing.

The navigation and drive control commands and the working control commands are determined based upon the control characteristics.

The accessory control unit 8 is configured to control the vehicle 4 provided with the vehicle accessory arrangement 2, by the determined navigation and drive commands and working control commands, to fulfil the working assignment when being operated in an autonomous mode.

According to one embodiment the control characteristics comprises at least one of the following parameters: specific features of actuators, geometry of the vehicle, control parameters, autonomous driving parameters, and other parameters required to operate the vehicle 4 in an autonomous mode. The geometry of the vehicle may comprise the length and width of the vehicle and the wheel base length.

According to another embodiment the navigation and drive control commands and the working control commands are determined by applying transformation algorithms which are based upon the received control characteristics.

The transformation algorithms will translate, transfer, and/or adapt, the vehicle movements required to achieve the assignments to drive and working control commands such that the various control units at the vehicle will be able to correctly interpret the control commands generated by the accessory control unit.

Transformation algorithms related to a specific vehicle are preferably included in the vehicle data set related to the specific vehicle. Thus, a specific transformation algorithm is preferably designated each of the control characteristics in a vehicle data set of a specific vehicle, e.g. the vehicle data sets includes a transformation algorithm related to the control of a steering angle of the vehicle.

Preferably, the accessory control unit 8 is configured to dynamically update the control characteristics in dependence of performed working assignments. By implementing a feedback procedure, where the resulting performance during working assignments is taken into account by comparing and analysing applied control signals with the resulting operations, a learning process is applied which will improve the accuracy of the control. Also the transformation algorithms may be dynamically updated.

In order for the vehicle to move in narrow spaces continuous real time feedback of the position of the vehicle is important. This is important in that one driving activity, e.g. turning the vehicle by a specific steering angle, may result in different turning radiuses in dependent of the friction of the ground, i.e. if it is slippery and icy or if the ground is dry.

The vehicle data set may be received and retrieved according to a number of different ways.

According to one embodiment the accessory control unit 8 is configured to receive the vehicle data set from an external control centre 20 via the wireless signal receiver 18, or from the vehicle 4 on which the accessory arrangement 2 is mounted via the accessory communication bus 12.

In one embodiment the accessory control unit 8 is configured to determine which vehicle data set to be applied among the plurality of different vehicle data sets, by identifying the vehicle 4 on which the accessory arrangement 2 is mounted. The identification is performed either by receiving identification data from the vehicle 4, or by sending an identification request to the vehicle and receiving identification data from the vehicle, and to determine the vehicle data set to be applied in dependence of the identification. The identification data may e.g. comprise the vehicle type, the vehicle brand, the vehicle product series, a unique identifier for the particular vehicle unit. The received identification data is then mapped to a vehicle data set stored in a memory on the accessory arrangement. The memory on the accessory arrangement may include a plurality of the other vehicle data sets. According to this embodiment the identification is performed automatically during a set-up procedure which is performed during mounting of the working equipment at the vehicle.

In another embodiment the accessory control unit 8 is configured to determine which of the vehicle data set to be applied among the plurality of different vehicle data sets, by receiving a vehicle identification signal 22 from an operator of the accessory arrangement 2, which identification signal 22 includes identification data for the vehicle on which the accessory arrangement 2 is mounted, and to determine the vehicle data set to be applied in dependence of said identification. Thus, this embodiment relates to a manual identification of the vehicle data set to be used.

In case the plurality of different vehicle data sets are stored at the accessory arrangement an accessory memory 24 is provided which is configured to store the plurality of different vehicle data sets. The accessory memory may be an integral part of the accessory control unit or a separate unit.

The accessory control unit 8 is configured to control the vehicle by the navigation and drive commands and the working control commands, by applying the commands to the vehicle communication bus 16 via the accessory communication bus 12 and the bus interface 14. In one variation the accessory control unit 8 instead is configured to control the vehicle by the navigation and drive commands and the working control commands, by applying a subset of the commands via the accessory communication bus 12 directly to one or many various units of the vehicle to be controlled. The units that may be directly controlled may relate to the velocity of the vehicle, brakes and steering. In one exemplary variation the gearing box and the suspension system of the vehicle is controlled via the communication bus 16, and the velocity, the brakes, and the steering of the vehicle is directly controlled via the accessory communication bus 12.

The working assignment may relate to a plurality different fields of operation, and may comprise working procedures related to one of the following exemplary procedures: a loading or unloading procedure, a forestry machine procedure, a tail lift procedure, a hook lift procedure, a mining procedure. The applied route data comprises positional data required to follow a route related to the working procedure. One particular field of operation is large indoor or outdoor storage facilities where often many vehicles operate at the same time.

Figure 3:
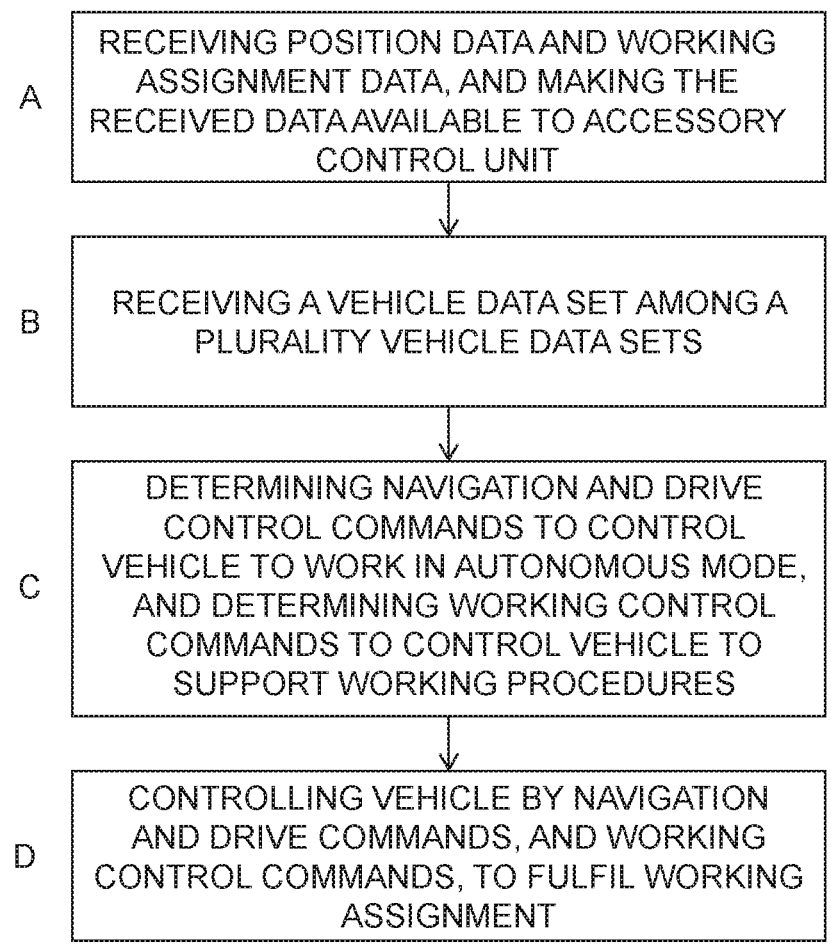
FIG. 3 is a flow diagram illustrating the method according to the present invention.

The present invention also relates to a method in relation to a vehicle accessory arrangement 2 structured to be mounted on a vehicle 4. The method will be described with references to the flow diagram shown in FIG. 3.

The accessory arrangement 2 has been described in detail above and it is herein also referred to that description. Thus, the accessory arrangement comprises a working equipment 6, e.g. a hook-lift device, an accessory control unit 8 configured to determine accessory control signals 10 and to control said working equipment 6 by said signals, and an accessory communication bus 12 comprising a bus interface 14 configured to connect said accessory communication bus 12 to a vehicle communication bus 16 provided at said vehicle.

The method comprises:

A—Receiving current position data, e.g. GPS data, and working assignment data including route data for a working assignment for said vehicle 4 provided with said working equipment 6, and making said received position data and working assignment data available to said accessory control unit 8.

B—Receiving a vehicle data set among a plurality of different vehicle data sets, each of said plurality of vehicle data sets comprises control characteristics of a vehicle on which the accessory arrangement may be mounted.

C—Determining navigation and drive control commands adapted to control said vehicle 4 provided with said vehicle accessory arrangement 2 to work in an autonomous mode and to travel along a route of a working assignment, and determining working control commands adapted to control said vehicle 2 such that working procedures performed by said working equipment 6 are supported, wherein said navigation and drive control commands and said working control commands are determined based upon said control characteristics.

D—Controlling said vehicle 4 provided with said vehicle accessory arrangement 2, by said determined navigation and drive commands and working control commands, to fulfil said working assignment.

According to one embodiment the method comprises determining the navigation and drive control commands and the working control commands by applying transformation algorithms which are based upon said received control characteristics.

In a further embodiment the method comprises dynamically updating the control characteristics, and preferably also related transformation algorithms, in dependence of performed working assignments.

According to still another embodiment the method comprises receiving the vehicle data set from an external control centre 20 via the wireless signal receiver 18 or from the vehicle 4 on which the accessory arrangement 2 is mounted via the accessory communication bus 12.

According to another embodiment the method comprises determining which vehicle data set to be applied among said plurality of different vehicle data sets, either by:
 identifying the vehicle 4 on which the accessory arrangement 2 is mounted, wherein the identification is performed either by receiving identification data from said vehicle 4, or by sending an identification request to said vehicle and receiving identification data from said vehicle, and determining the vehicle data set to be applied in dependence of said identification; or by:
 receiving a vehicle identification signal 22 from an operator of said accessory arrangement 2, wherein said identification signal 22 includes identification data for the vehicle on which the accessory arrangement 22 is mounted, and determining the vehicle data set to be applied in dependence of said identification.

One typical application of vehicles provided with the vehicle accessory arrangement disclosed herein is in a closed factory area where the vehicle is an autonomous truck for delivering goods. In such an application the truck must be configured to move in narrow spaces, to handle situations where many other vehicles move, and also meet high safety standards as people also may be present in such an environment.

In other applications the vehicle is used in the mining industry, in the forestry, but also in various other situations, e.g. loading and unloading of goods, collecting and emptying bins of garbage, etc.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A vehicle accessory arrangement structured to be mounted on a vehicle, the accessory arrangement comprises:
 a working equipment,
 an accessory control unit configured to determine accessory control signals and to control said working equipment by said signals,
 an accessory communication bus comprising a bus interface configured to connect said accessory communication bus to a vehicle communication bus provided at said vehicle,
 wherein
 said accessory arrangement comprises a wireless signal receiver configured to receive current position data, e.g. GPS data, and working assignment data including route data for a working assignment for said vehicle provided with said working equipment, and to make said received position data and working assignment data available to said accessory control unit,
 said accessory control unit is configured to receive a vehicle data set among a plurality of different vehicle data sets, each of said plurality of vehicle data sets comprises control characteristics of a vehicle on which the accessory arrangement may be mounted,
 wherein said accessory control unit is configured to determine:
 navigation and drive control commands adapted to control said vehicle provided with said vehicle accessory arrangement to work in an autonomous mode and to travel along a route of a working assignment,
 working control commands adapted to control said vehicle such that working procedures performed by said working equipment are supported, wherein said navigation and drive control commands and said working control commands are determined based upon said control characteristics, and wherein said accessory control unit is configured to control said vehicle provided with said vehicle accessory arrangement, by said determined navigation and drive commands and working control commands, to fulfil said working assignment.

2. The vehicle accessory arrangement according to claim 1, wherein said control characteristics comprises at least one of the following parameters: specific features of actuators, geometry of the vehicle, control parameters, autonomous driving parameters, and other parameters required to operate said vehicle in an autonomous mode.

3. The vehicle accessory arrangement according to claim 1, wherein said navigation and drive control commands and said working control commands are determined by applying transformation algorithms which are based upon said received control characteristics.

4. The vehicle accessory arrangement according to claim 1, wherein said accessory control unit is configured to dynamically update said control characteristics in dependence of performed working assignments.

5. The vehicle accessory arrangement according to claim 1, wherein said accessory control unit is configured to receive said vehicle data set from an external control centre via said wireless signal receiver or from the vehicle on which the accessory arrangement is mounted via said accessory communication bus.

6. The vehicle accessory arrangement according to claim 1, wherein said accessory control unit is configured to determine which vehicle data set to be applied among said plurality of different vehicle data sets, by identifying the vehicle on which the accessory arrangement is mounted, wherein the identification is performed by receiving identification data from said vehicle.

7. The vehicle accessory arrangement according to claim 1, wherein said accessory control unit is configured to determine which of said vehicle data set to be applied among said plurality of different vehicle data sets, by receiving a vehicle identification signal from an operator of said accessory arrangement, wherein said identification signal includes identification data for the vehicle on which the accessory arrangement is mounted, and to determine the vehicle data set to be applied in dependence of said identification.

8. The vehicle accessory arrangement according to claim 1, comprising an accessory memory configured to store said plurality of different vehicle data sets.

9. The vehicle accessory device according to any of claim 1, wherein said accessory control unit is configured to control said vehicle by said navigation and drive commands and said working control commands, by applying said commands to said vehicle communication bus via said accessory communication bus and said bus interface.

10. The vehicle accessory arrangement according to claim 1, wherein said working assignment comprises working procedures related to one of the following: a loading or unloading procedure, a forestry machine procedure, a tail lift procedure, a hook lift procedure, a mining procedure; and wherein said route data comprises positional data required to follow a route related to the working procedure.

11. A method in relation to a vehicle accessory arrangement structured to be mounted on a vehicle, the accessory arrangement comprises:

a working equipment, an accessory control unit configured to determine accessory control signals and to control said working equipment by said signals, an accessory communication bus comprising a bus interface configured to connect said accessory communication bus to a vehicle communication bus provided at said vehicle, wherein the method comprises: receiving current position data, e.g. GPS data, and working assignment data including route data for a working assignment for said vehicle provided with said working equipment, and making said received position data and working assignment data available to said accessory control unit;

receiving a vehicle data set among a plurality of different vehicle data sets, each of said plurality of vehicle data sets comprises control characteristics of a vehicle on which the accessory arrangement may be mounted;

determining navigation and drive control commands adapted to control said vehicle provided with said vehicle accessory arrangement to work in an autonomous mode and to travel along a route of a working assignment, and determining working control commands adapted to control said vehicle such that working procedures performed by said working equipment are supported, wherein said navigation and drive control commands and said working control commands are determined based upon said control characteristics, and controlling said vehicle provided with said vehicle accessory arrangement, by said determined navigation and drive commands and working control commands, to fulfil said working assignment.

12. The method according to claim 11, comprising determining said navigation and drive control commands and said working control commands by applying transformation algorithms which are based upon said received control characteristics.

13. The method according to claim 11, comprising dynamically updating said control characteristics in dependence of performed working assignments.

14. The method according to claim 11, comprising receiving said vehicle data set from an external control centre via said wireless signal receiver or from the vehicle on which the accessory arrangement is mounted via said accessory communication bus.

15. The method according to claim 11, comprising determining which vehicle data set to be applied among said plurality of different vehicle data sets, either by:

identifying the vehicle on which the accessory arrangement is mounted, wherein the identification is performed either by receiving identification data from said vehicle, or by sending an identification request to said vehicle and receiving identification data from said vehicle, and determining the vehicle data set to be applied in dependence of said identification; or by:

receiving a vehicle identification signal from an operator of said accessory arrangement, wherein said identification signal includes identification data for the vehicle on which the accessory arrangement is mounted, and determining the vehicle data set to be applied in dependence of said identification.

* * * * *